(12) United States Patent
Chen et al.

(10) Patent No.: US 10,375,035 B2
(45) Date of Patent: Aug. 6, 2019

(54) COEXISTENCE MANAGEMENT FOR MULTIPLE WIRELESS DEVICES BY A WIRELESS NETWORK DEVICE

(71) Applicant: Apple Inc., Cupertino, CA (US)

(72) Inventors: Camille Chen, Cupertino, CA (US); Ye Sun, San Jose, CA (US); Hsin-Yao Chen, Castro Valley, CA (US); Siegfried Lehmann, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/479,191

(22) Filed: Apr. 4, 2017

(65) Prior Publication Data
US 2018/0084558 A1   Mar. 22, 2018

Related U.S. Application Data

(60) Provisional application No. 62/398,479, filed on Sep. 22, 2016, provisional application No. 62/398,477, filed on Sep. 22, 2016.

(51) Int. Cl.
| | |
|---|---|
| *H04W 4/00* | (2018.01) |
| *H04L 29/06* | (2006.01) |
| *H04W 4/80* | (2018.01) |
| *H04L 9/08* | (2006.01) |
| *H04W 12/06* | (2009.01) |
| *H04W 4/21* | (2018.01) |

(Continued)

(52) U.S. Cl.
CPC ............ *H04L 63/0428* (2013.01); *H04L 9/08* (2013.01); *H04W 4/21* (2018.02); *H04W 4/80* (2018.02); *H04W 12/06* (2013.01); *H04L 2209/80* (2013.01); *H04W 12/04* (2013.01); *H04W 84/12* (2013.01); *H04W 88/06* (2013.01)

(58) Field of Classification Search
CPC . H04W 72/082; H04W 4/80; H04W 72/0446; H04W 72/0413; H04W 84/12; H04B 17/318; H04L 47/72
See application file for complete search history.

(56) References Cited

U.S. PATENT DOCUMENTS

| | | |
|---|---|---|
| 8,249,031 B1 | 8/2012 | Hirsch et al. |
| 8,335,206 B1 | 12/2012 | Hirsch et al. |

(Continued)

*Primary Examiner* — Lan-Huong Truong
(74) *Attorney, Agent, or Firm* — Dickinson Wright RLLP

(57) ABSTRACT

Methods and apparatuses for managing coexistence of multiple wireless devices that share a radio frequency band and communicate with a wireless network device. The wireless devices include both wireless personal area network (WPAN) and wireless local area network (WLAN) devices. The wireless network device monitors data activity for WPAN devices to determine whether the WPAN devices are active or inactive, and sets one or more polling intervals for the WPAN devices accordingly. The wireless network device consolidates polling for multiple WPAN devices into a common WPAN polling time period and sends a radio frequency (RF) reservation request to a WLAN access point (AP), the RF reservation request including an indication of a duration for the common WPAN polling time period, during which the multiple WPAN devices are polled. WLAN data packet transmission is delayed during the common WPAN polling time period to mitigate coexistence interference.

20 Claims, 10 Drawing Sheets

(51) Int. Cl.
*H04W 84/12* (2009.01)
*H04W 12/04* (2009.01)
*H04W 88/06* (2009.01)

(56) References Cited

U.S. PATENT DOCUMENTS

| | | | |
|---|---|---|---|
| 8,902,923 B2* | 12/2014 | Hiremath | H04W 4/80 370/464 |
| 2004/0116075 A1 | 6/2004 | Shoemake et al. | |
| 2008/0130603 A1* | 6/2008 | Wentink | H04W 74/085 370/338 |
| 2008/0205365 A1 | 8/2008 | Russell et al. | |
| 2008/0238807 A1* | 10/2008 | Ibrahim | H01Q 21/29 343/876 |
| 2008/0279138 A1 | 11/2008 | Gonikberg et al. | |
| 2008/0299987 A1 | 12/2008 | Iyer et al. | |
| 2009/0285167 A1* | 11/2009 | Hirsch | H04W 72/1215 370/329 |
| 2009/0312010 A1* | 12/2009 | Hall | H04W 72/1215 455/426.1 |
| 2012/0071185 A1 | 3/2012 | Dayal et al. | |
| 2013/0260686 A1* | 10/2013 | Mukherjee | G06F 9/5027 455/41.2 |
| 2015/0024687 A1 | 1/2015 | Rawat et al. | |
| 2015/0043493 A1* | 2/2015 | Gajanan | H04W 16/14 370/329 |
| 2015/0092642 A1* | 4/2015 | Geboff | H04L 69/329 370/311 |
| 2015/0319700 A1* | 11/2015 | Oteri | H04W 52/28 455/127.1 |
| 2015/0358995 A1* | 12/2015 | Li | H04L 5/0007 370/329 |
| 2016/0086175 A1 | 3/2016 | Finlow-Bates et al. | |
| 2016/0182469 A1 | 6/2016 | Ahmed et al. | |
| 2017/0060645 A1* | 3/2017 | Gasselin de Richebourg | G06F 9/54 |
| 2017/0126363 A1* | 5/2017 | Wang | H04L 1/08 |
| 2018/0084419 A1 | 3/2018 | Sun et al. | |

* cited by examiner

400 

SENDING A RADIO FREQUENCY (RF) RESERVATION REQUEST TO A WIRELESS LOCAL AREA NETWORK (WLAN) DEVICE, IN RESPONSE TO AN INTERNAL TRIGGER INDICATING A WIRELESS PERSONAL AREA NETWORK (WPAN) POLLING PERIOD FOR ONE OR MORE ACTIVE WPAN DEVICES ASSOCIATED WITH THE WIRELESS NETWORK DEVICE, THE RF RESERVATION REQUEST INCLUDING AN INDICATION OF A DURATION OF A POLLING PERIOD FOR THE WIRELESS NETWORK DEVICE TO COMMUNICATION IN AN RF BAND SHARED WITH THE WLAN DEVICE
402

POLLING THE ONE OR MORE ACTIVE WPAN DEVICES FOR DATA DURING THE POLLING PERIOD, THE DURATION OF THE POLLING PERIOD BEING BASED AT LEAST IN PART ON THE NUMBER OF ACTIVE WPAN DEVICES ASSOCIATED WITH THE WIRELESS NETWORK DEVICE
404

*FIG. 4A*

COEXISTENCE MANAGEMENT FOR MULTIPLE WIRELESS DEVICES BY A WIRELESS NETWORK DEVICE

CROSS-REFERENCE TO RELATED APPLICATIONS

This application claims the benefit of U.S. Provisional Patent Application No. 62/398,477, entitled "COEXISTENCE INTERFERENCE MITIGATION DURING WIRELESS LOCAL AREA NETWORK AUTHENTICATION," by Ye Sun et al., filed on Sep. 22, 2016, and the benefit of U.S. Provisional Patent Application No. 62/398,479, entitled "COEXISTENCE MANAGEMENT FOR MULTIPLE WIRELESS DEVICES BY A WIRELESS NETWORK DEVICE", by Camille Chen et al., filed on Sep. 22, 2016, the contents of both of which are incorporated by reference herein in their entirety for all purposes.

This application is related to U.S. patent application Ser. No. 15/479,195, entitled "COEXISTENCE INTERFERENCE MITIGATION DURING WIRELESS LOCAL AREA NETWORK AUTHENTICATION", by Ye Sun et al., filed Apr. 4, 2017, the content of which is incorporated by reference herein in its entirety for all purposes.

FIELD

The described embodiments set forth methods and apparatus for managing coexistence of multiple wireless devices by a wireless network device, including to coordinating communication for multiple wireless personal area network (WPAN) devices to accommodate wireless local area network (WLAN) communication by the wireless network device in a shared radio frequency band.

SUMMARY

The embodiments described herein set forth methods and apparatuses for managing coexistence of multiple wireless devices that share a common radio frequency band and connect to a common wireless network device. The multiple wireless devices include both WPAN devices and WLAN devices that communicate in the same radio frequency band. The wireless network device monitors data activity for WPAN devices to determine whether the WPAN devices are active or inactive, and sets polling intervals for the WPAN devices based at least in part on the active status. The wireless network device consolidates polling for multiple WPAN devices into a common WPAN polling time period and sends a radio frequency (RF) reservation request to a WLAN access point (AP), the RF reservation request including an indication of a duration for the common WPAN polling time period, during which the multiple WPAN devices are polled. WLAN data packet transmission is delayed during the common WPAN polling time period to mitigate coexistence interference. Aggregation for WLAN data packets is selectively enabled or disabled based on measured signal strength for signals received from the WLAN AP and/or based on the number of active WPAN devices. WPAN circuitry in the wireless network device communicates directly with WLAN circuitry in the wireless network device to indicate forthcoming polling periods for the WPAN devices. These and other techniques are described further herein.

This Summary is provided only for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 4A and 4B illustrate flowcharts of example methods for managing coexistence of multiple wireless devices communicating with a wireless network device, according to some embodiments.

DETAILED DESCRIPTION

Figure 1:
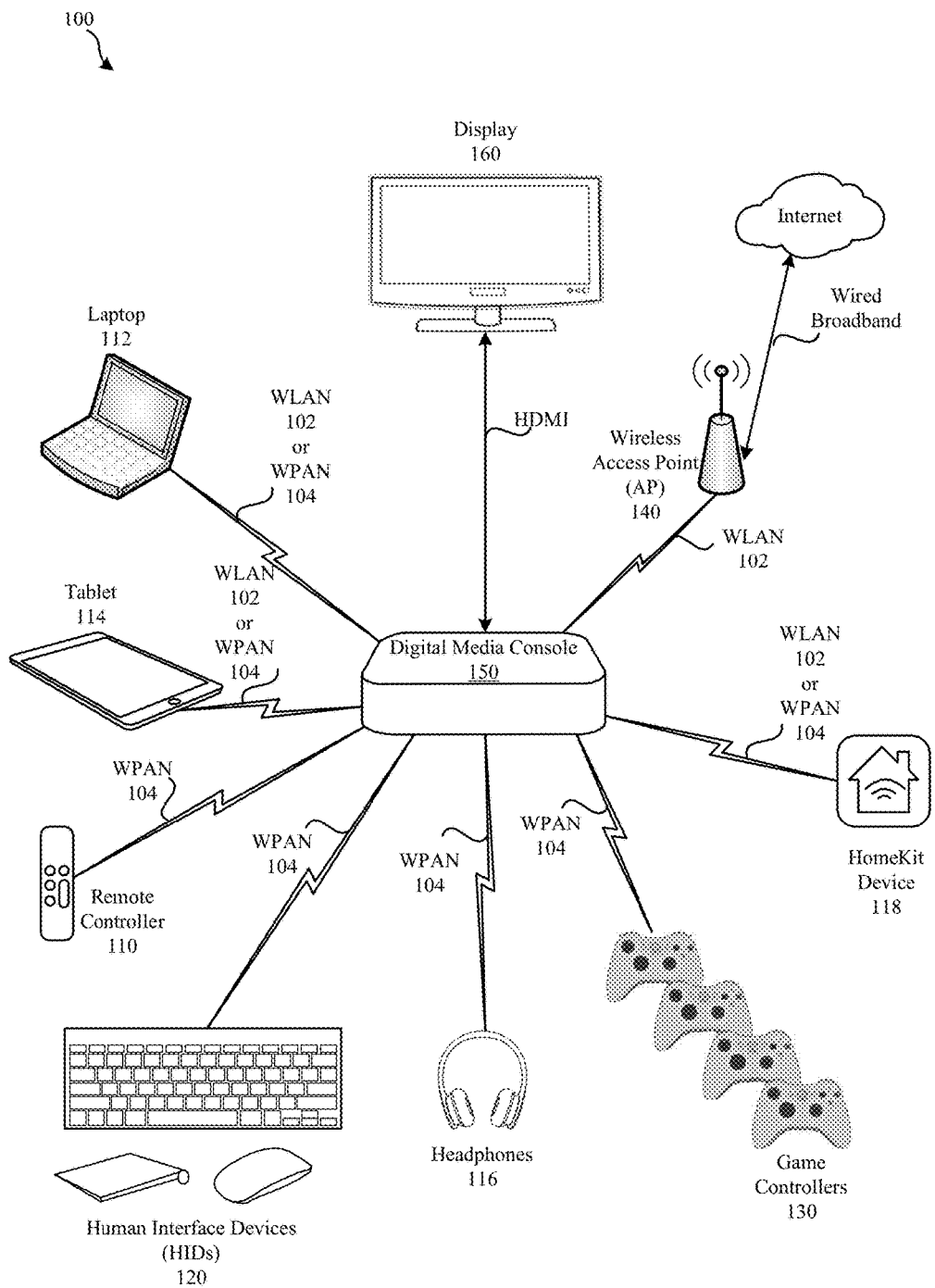
FIG. 1 illustrates a block diagram of different components of an example system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices incorporate multiple wireless communication technologies that provide communication over different wireless networks, e.g., Long Term Evolution (LTE) cellular technology for wireless wide area network (WWAN) communication, Wi-Fi technology for wireless local area network (WLAN) communication, and Bluetooth® for wireless personal area network (WPAN) communication. Communication by different wireless interfaces that use different wireless communication technologies can interfere with each other when using common, overlapping, and/or adjacent radio frequency bands. In some configurations, a WPAN interface and a WLAN interface of a wireless network device can each use a common radio frequency band, such as the 2.4 GHz Industrial, Scientific, and Medical (ISM) radio frequency band. Coexistence algorithms to mitigate interference can use clear-to-send-to-self (CTS2S) messages and/or power save (PS) modes, which delay transmission on a WLAN interface to allow for transmission by another interface, such as a WPAN interface, without overlapping interference. Co-located wireless interfaces of the same wireless network device can interfere with each other when transmissions by each wireless interface are asynchronous, independent, and overlapping in a combination of time and frequency with each other. Coordinating transmissions and communication between wireless interfaces of the same wireless network device can provide efficient use of a common, shared radio frequency band.

Information and entertainment electronic devices have expanded capabilities and morphed into network connected digital media consoles with features previously provided independently by, e.g., desktop computers, servers, and dedicated game consoles. Applications in a wireless network device, such as an Apple TV®, can provide access to a broad variety of network-stored media as well as interactive gaming. As a central device connecting a display to various human interface devices (HIDs), such as game controllers and user input devices with which a user can interact with the wireless network device to control access to media and to play games, the wireless network device, which can also be referred to as an digital media console, a set-top box, a network appliance, or a digital media extender, includes wireless interfaces for localized communication, such as provided by a wireless personal area network (WPAN), and for remote communication, such as provided by a wireless local area network (WLAN) to a wireless access point (AP) that can interconnect to cloud-based services provided by servers on the Internet. Users of the wireless network device, while playing online games via game controllers connected to the wireless network device via local WPAN connections, can access game content from the Internet via a WLAN connection through a WLAN AP to the Internet, which can require substantial network bandwidth. When the WLAN AP connects to the wireless network device using the same RF band as used by the WPAN connections, coexistence interference between the WLAN connection and the WPAN connections can occur. In particular, the Industrial, Scientific, and Medical (ISM) RF band at 2.4 GHz is commonly used for both WPAN devices that comply with the Bluetooth (BT) Special Interest Group (SIG) wireless communication protocols and wireless APs that comply with the Institute of Electrical and Electronic Engineers (IEEE) 802.11 wireless communication protocols, commonly referred to as Wi-Fi. For wireless network devices that include sufficient isolation between WPAN and WLAN wireless interfaces, communication with multiple WPAN devices and a WLAN AP at the same time can occur with minimal interference between them. With some wireless network devices that have less isolation between WPAN and WLAN wireless interfaces and/or share common wireless circuitry, such as one or more antennas and one or more transit signal chains or receive signal chains, overlapping communication in time can result in coexistence interference and compromise performance. In one example, to support interactive gaming with multiple, e.g., up to four simultaneous, game controllers communicating via WPAN connections and a WLAN connection to a WLAN AP that connects to the Internet, consolidating the WPAN communication into common WPAN polling time periods and managing polling intervals for different WPAN devices can allow for sufficient WLAN communication in other time periods that do not overlap with the WPAN polling time periods.

A wireless network device, such as an Apple TV device, can monitor data activity of one or more associated WPAN devices that require frequent, regular polling to exchange data, such as game controllers. Based on the monitored data activity, the wireless network device can determine whether a WPAN device is active or inactive (or determine an activity level of the WPAN device). The wireless network device can adjust polling time intervals based at least in part on whether the WPAN device is active or inactive (or on the activity level of the WPAN device). In some embodiments, the wireless network device increases the polling time interval for inactive WPAN devices, e.g., from 15 ms for an active WPAN device to 30 ms for an inactive WPAN device. The polling time interval for the WPAN device can depend on one or more applications that use communication to/from the WPAN device. The wireless network device can determine appropriate polling time intervals based at least in part on how often and for what purposes the WPAN device is used. For a set of WPAN devices, such as a set of game controllers, that have a common polling interval (or multiple thereof), the wireless network device can aggregate together polling for the set of WPAN devices in a common polling time period. The wireless network device can send a radio frequency reservation request, such as a Clear-To-Send-To-Self (CTS2S) message, to a WLAN AP to reserve time for communication for the set of WPAN devices, where the WLAN AP can withhold communication during a requested time in order for the wireless network device to communicate with the set of WPAN devices. The CTS2S message can include an indication of an amount of time requested. The wireless network device can adjust the time requested based on the number of active WPAN devices. The wireless network device can poll the set of WPAN devices during the common polling time period. Intervals between polling for WPAN devices can be adjusted based on data activity of the WPAN devices. For example, active WPAN devices can be polled at a shorter polling time interval, while inactive (or less active) WPAN devices can be polled at longer polling time intervals. The RF reservation request message can include a destination address for the wireless network device to block RF transmission by other devices, e.g., by the wireless AP, for an amount of time requested. In some embodiments, the wireless network device uses a power saving mode to halt communication via the WLAN interface to allow for polling of the set of WPAN devices via the WPAN interface. In some embodiments, the wireless network device sends a null data packet with a power saving (PS) bit set to a value that indicates to the WLAN AP that the wireless network device is in a power saving mode, and the WLAN AP can acknowledge (ACK) receipt of the PS mode message and buffer data at the WLAN AP until the wireless network device exits the power saving mode. In some embodiments, the wireless network device sends CTS2S messages to the WLAN AP for WPAN communication that includes time critical (e.g., low latency) data packets, such as for enhanced Synchronous Connection Oriented (eSCO) BT data packets, sniffer data packets, or BT Low Energy (BTLE) data packets. In some embodiments, the wireless network device sends PS mode messages for deferrable (e.g., latency tolerant) data packets, such as for Advanced Audio Distribution Profile (A2DP) BT data packets. In some embodiments, in the wireless network device, a WPAN module provides an indication to a WLAN module of a common polling time period before the time period starts. In some embodiments, the WLAN module of the wireless network device adjusts use of aggregation of WLAN data packets (e.g., enabling or disabling) based on one or more of: an amount time required for the common polling time period, a measured signal strength of signals received from the WLAN AP, or a number of active WPAN devices. In some embodiments, the WPAN module indicates to the WLAN module, when indicating a common polling time period, whether polling for the WPAN devices includes data packets or null packets.

Accordingly, the foregoing approaches provide techniques for managing communication for multiple wireless interfaces of a wireless network device, including a WLAN interface and a WPAN interface, to divide time efficiently for use of each wireless interface of the wireless network device. A more detailed discussion of these techniques is set forth below and described in conjunction with FIGS. 1-6, which illustrate detailed diagrams of representative systems, methods, and apparatuses that can be used to implement these techniques.

FIG. 1 illustrates a block diagram of different components of a system 100 that is configured to implement the various techniques described herein, according to some embodiments. FIG. 1 illustrates a high-level overview of the system 100, which includes an digital media console 150 interconnected to a variety of devices, including some used for displaying media output, e.g., the display 160 connected via a wired high definition media interface (HDMI) connection, and some used for generating, mirroring, and/or transferring media input, e.g., a laptop 112, a tablet 114, or a WLAN AP 140, connected via a WLAN 102 connection and/or via a WPAN 104 connection. Additional user devices can include human interface devices 120 (HIDs), such as keyboards, pointers, mice, or track pads, as well as a remote controller 110, each of which can be used to access and/or control media alone or in combination with other user devices. A user of the system 100 can also receive audio output via a set of wireless headphones 116 via a WPAN 104 connection. Additionally, one or more users can provide input control for gaming via a set of game controllers 130, where the digital media console 150 provides a central connection to output devices, such as the display 160 and headphones 116, and input devices, such as the game controllers 130 and the WLAN AP 140, through which the digital media console 150 can receive media, including for gaming, from a remote server, e.g., via a cloud-based service. Moreover, other wireless enabled devices, such as a HomeKit™ device 118, can be connected to the digital media console 150. The system 100 represents a combination of hardware and software components that enable wireless communication sessions, including both WLAN 102 connections and WPAN 104 connections, to occur between the digital media console 150 and a variety of user devices.

The user devices can communicate with the digital media console 150 via wireless local area network (WLAN) communication links 102 (e.g., Wi-Fi) and/or via wireless personal area network (WPAN) communication links 104 (e.g., Bluetooth®). Moreover, while the techniques are described herein in terms of Bluetooth® and Wi-Fi connections, the same techniques can be applied to other combinations of wireless connections that can interfere with each other, e.g., due to coexistence interference in the same, overlapping, and/or adjacent radio frequency bands. WLAN connections 102 and WPAN connections 104 can operate in accordance with established WLAN and WPAN wireless communication protocols, such as those specified by the Institute of Electrical and Electronic Engineers (IEEE) 802.11 Wi-Fi and the Bluetooth Special Interest Group (SIG).

With the broad array of user devices to which the digital media console 150 can connect and that it may service, the frequency and amount of information to be communicated via various wireless connections can potentially interfere with each other when using a common radio frequency band, such as the 2.4 GHz ISM band. For example, a user of the digital media console 150 can expect near instantaneous response from a remote 110 device via a WPAN 104 connection, while also requiring low latency, responsiveness from interaction via game controllers 130, using WPAN 104 connections. In some cases, the digital media console 150 receives media, or more generally data, via a WLAN connection 102 with a WLAN AP 140 that interconnects via a wired broadband connection to the Internet. Media (or data) received from the WLAN AP 140 can include streaming media for display and/or data for rendering part of a gaming application, for example. The digital media console 150, to provide a robust and responsive user experience for media display, gaming, and/or other applications, can seek to ensure adequate communication with the broad array of user devices with which the digital media console 150 is connected. In some cases, the digital media console 150 can include a limited set of wireless circuitry, e.g., sharing antenna(s), transmit signal chains, and/or receive signal chains, with insufficient radio frequency isolation to allow for simultaneous interference-free communication via WPAN 104 connections and WLAN 102 connections. The digital media console 150 can balance responsive, low latency communication requirements, such as for game controllers 130 and/or remote controllers 110, with deferrable communication requirements, such as for media playback or HomeKit device monitoring. In addition, the digital media console 150 can assure sufficient communication bandwidth for WLAN 102 connections, which can be used in some cases to receive data for use in combination with input from low latency, real-time sensitive devices, such as the game controllers 130 and/or remote controller(s) 110.

Figure 2:
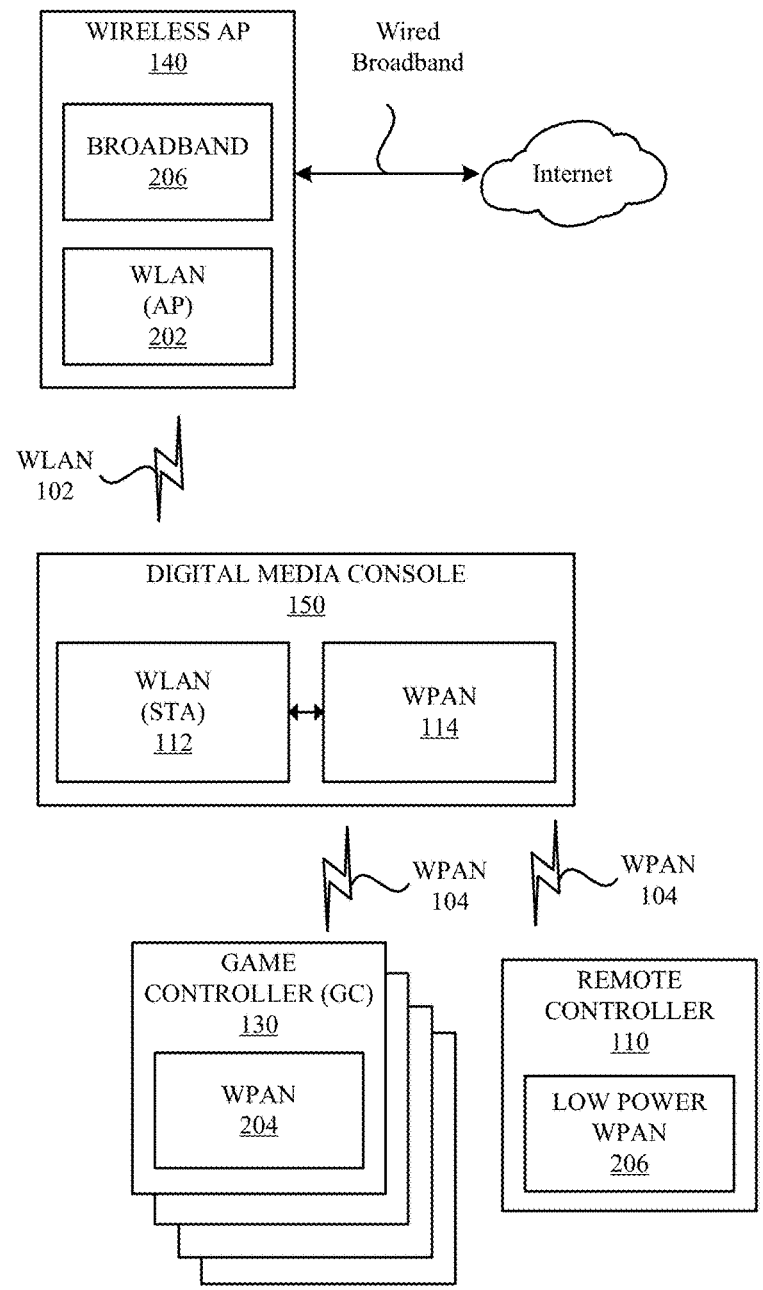
FIG. 2 illustrates a block diagram of select components of the system illustrated in FIG. 1, according to some embodiments.

FIG. 2 illustrates a block diagram 200 of select components of the system 100 illustrated in FIG. 1. The components illustrated in FIG. 2 can be used in combination to provide service for, e.g., a gaming application resident, at least in part, on the digital media console 150. In some cases, the digital media console 150 can include one or more applications, such as a gaming application, which can receive inputs from a set of game controllers 130 using WPAN 104 connections. The game controllers 130 can include WPAN modules 204, which can include a combination of hardware and software to communicate with a corresponding WPAN module 114 of the digital media console 150. Multiple game controllers 130 can communicate using a common WPAN 104 connection. Additional devices such as a remote controller 110 can also communicate with the digital media console 150 via a WPAN 104 connection, which in some cases can be a lower power WPAN 104 connection, such as a Bluetooth Low Energy (BTLE) connection. The remote controller 110 can include a low power WPAN module 206 with which to communicate with the WPAN module 114 of the digital media console. The digital media console 150 can include a WLAN module 112, which can be configured as a station (STA), to connect via a WLAN 102 connection to a WLAN AP 140. The WLAN AP 140 can include a WLAN module 202, which can be configured to allow WLAN AP 140 to connect with one or more WLAN STAs, such as the WLAN (STA) module 112 of the digital media console 150. The WLAN AP 140 can also include a broadband module 206 to provide a high-speed back haul connection to network-based services, such as via a wired broadband connection using the broadband module 206 to connect with the Internet. In some cases, media data, such as for streaming video, audio, multimedia, text, or other streaming services, which the digital media console 150 can provide access to via one or more applications resident on the digital media console 150, as well as application data, such as for a gaming application, can be obtained by the WLAN AP 140 via the wired broadband connection and communicated to the digital media console 150 via the WLAN 102 connection. For the gaming application, the digital media console 150 needs to balance obtaining command data from the game controllers 130 via WPAN 104 connections and application data from the WLAN AP 140 via the WLAN 102 connection, as information for both can be required for the gaming application. As discussed further herein, independent polling of all WPAN connected devices may leave insufficient bandwidth (or time) for the WLAN connection 102. As such, the digital media console 150 can adjust polling intervals and consolidate polling for the WPAN connected devices into common polling time periods to allow for additional bandwidth for the WLAN connection 102.

Figure 3A:
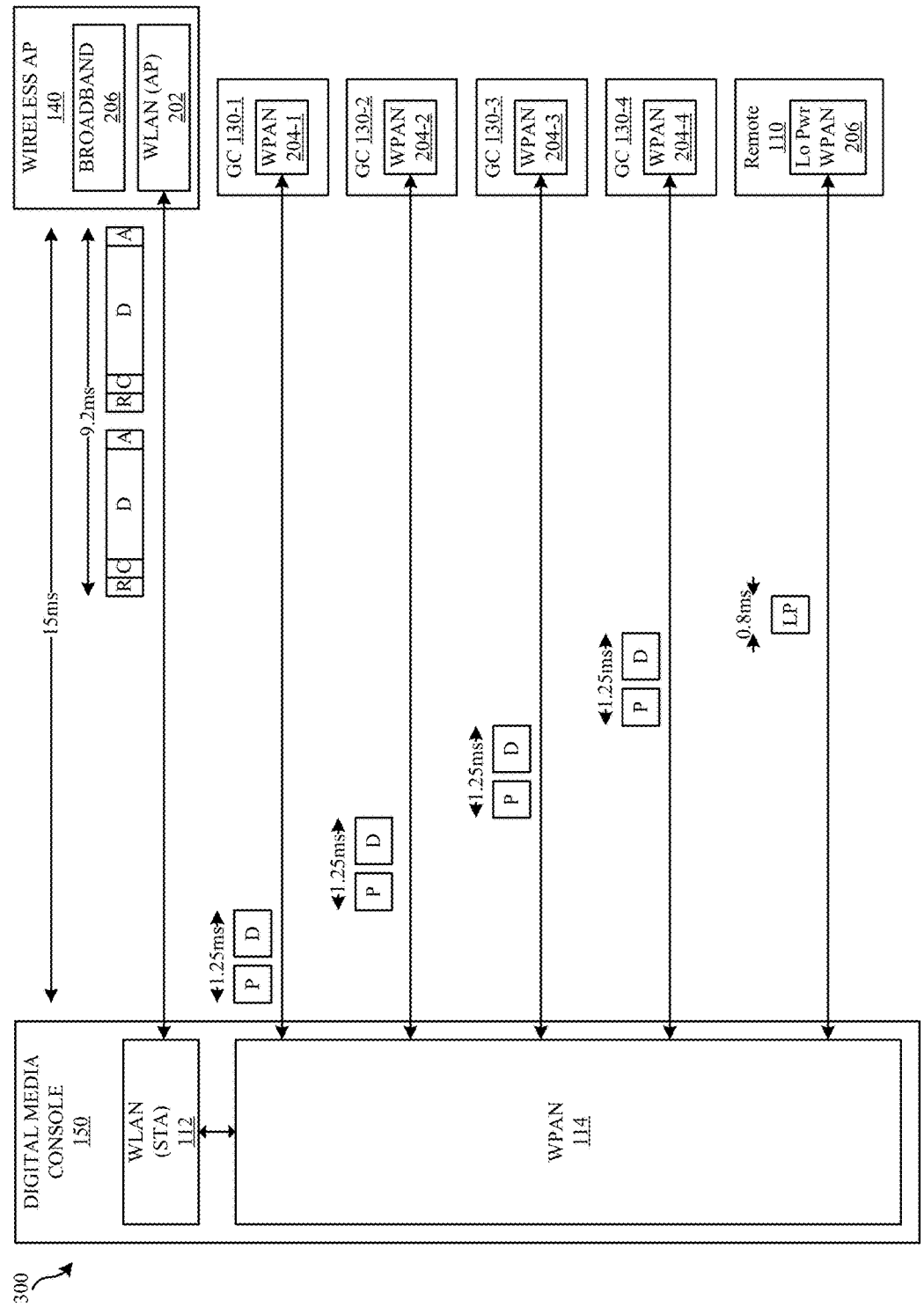
FIGS. 3A, 3B, 3C, and 3D illustrate exemplary sequences to divide a polling time period for communication among multiple devices, according to some embodiments.

FIG. 3A illustrates a diagram 300 of data packet communication between the digital media console 150 and multiple game controllers 130 and a WLAN AP 140 during a polling time interval. The polling time interval can be determined based on a requirement for retrieving data from the game controllers 130, e.g., at a regular interval that does not exceed 15 milliseconds (ms). Each game controller may have data to send to the digital media console 150 via a WPAN 106 connection. Protocol for communication via the WPAN 106 connection can require that the game controllers 130 wait for a poll from the WPAN module 114 of the digital media console 150 before communicating any pending data. Thus, the WPAN module 114 of the digital media console 150 can serve as a central WPAN device while the game controllers 130, and other WPAN connected devices, can serve as accessory peripheral WPAN devices. As shown in FIG. 3A, the WPAN module 114 of the digital media console 150 can poll each of the game controllers 130 separately. While the amount of data to be obtained from each game controller 130 can be limited, a minimum amount of time can be required to poll and retrieve the data from each game controller 130. In a representative case, a time duration of 1.25 ms can be required to poll (P) and receive data (D) from a single game controller 130. With four active game controllers 130, at least 5 ms (4×1.25 ms) can be used to obtain data from all of the game controllers 130 during a polling time period. In addition, the digital media console 150 can retrieve any control information from a remote controller 110 via a low power WPAN 104 connection. Typically, the low power WPAN 104 communication can require less time than a full power WPAN 104 communication. As illustrated in FIG. 3A, the WPAN module 114 of the digital media console 150 can use an additional 0.8 ms to obtain low power (LP) data from a single remote controller 110. Addition of one or more remote controllers 110 and/or game controllers 104 would increase the communication time beyond the total of 5.8 ms shown for the four game controllers 104 and one remote controller 110 illustrated in FIG. 3A.

For a polling interval of 15 ms, at most 9.2 ms remains for the WLAN (STA) module 112 of the digital media console 150 to communicate data with the WLAN (AP) module 202 of the WLAN AP 140. For communication via the WLAN 102, the WLAN (STA) 112 or WLAN (AP) 202 must determine whether the wireless medium is available for communication, e.g., by sending a Request To Send (RTS) followed by a Clear To Send (CTS) response that precedes data (D) and closing with an acknowledgement (A) or block acknowledgement (BA) for non-aggregated or aggregated packets respectively. Nominally, the WLAN (STA) 112 and the WLAN (AP) 202 have more than half the time of the polling interval of 15 ms for WLAN communication; however, in actuality, the WLAN (AP) module 202 of the WLAN AP 140 may operate independently with respect to the WPAN module 114 of the digital media console 150. While the WPAN module 114 and the WLAN (STA) module 112 of the digital media console 150 may be in communication with each other, the WLAN (AP) module 202 of the WLAN AP 140 may seek to communicate with multiple other WLAN connected devices, e.g., additional user devices as shown in FIG. 1. Communication with the game controllers 130 can be based on requirements for polling the game controllers 130 and controlled by the digital media console 150, while communication with the WLAN AP 140 can be controlled primarily by the WLAN AP 140, usually to provide downlink (DL) data from the WLAN AP 140 to the digital media console 150. As such, collisions between WLAN communication and WPAN communication may occur, which would extend the time to communicate data for both the WLAN AP 140 and the WPAN module 114 of the digital media console 150.

To mitigate coexistence interference between communication for the WPAN module 114 and communication for the WLAN (STA) module 112 of the digital media console 150, the WPAN module 114 can provide information to the WLAN (STA) module 112, e.g., scheduling information and/or a request to send signal, before the WPAN communication occurs, so that the WLAN (STA) module 112 can communicate with the WLAN (AP) module 202 of the WLAN AP 140 to complete, halt, and/or avoid WLAN communication during an upcoming WPAN communication polling time interval. The WLAN (STA) module 112 can use a Clear-To-Send-To-Self (CTS2S) message to indicate that the WLAN (STA) module 112 would like to reserve time on the wireless media, e.g., on a shared 2.4 GHz RF band, where the CTS2S message includes a destination address that corresponds to the WLAN (STA) module 112 of the digital media console 150. By sending the CTS2S message to the WLAN (AP) module 202 of the WLAN AP 140, the WLAN (STA) module 112 can seek to block WLAN communication to allow for WPAN communication. In some embodiments, the CTS2S message sent to the WLAN (AP) module 202 includes an indication of an amount of time requested. The WLAN (STA) module 112 can use the CTS2S message for time critical WPAN communication, a determination of which can be based at least in part of a WPAN profile, e.g., a Bluetooth profile, in use for the WPAN communication. Representative time critical WPAN communication can include packets for enhanced Synchronous Connection Oriented (eSCO) communication, sniffer packets, and lower power WPAN (e.g., BTLE) data packets. For deferrable WPAN communication, such as for Advanced Audio Distribution Profile (A2DP) data packets, the WLAN (STA) module 112 can send a power save (PS) message with a PS bit set to indicate that the WLAN (STA) module 112 will enter a power save mode and to request that the WLAN (AP) module 202 of the WLAN AP 140 hold pending data at the WLAN AP 140 until after exiting the power save mode. If the WLAN (AP) 202 module of the WLAN AP 140 honors the CTS2S request and/or the power save message, the WPAN 114 module of the digital media console 150 can communication WPAN data without interference from WLAN communication.

Figure 3B:
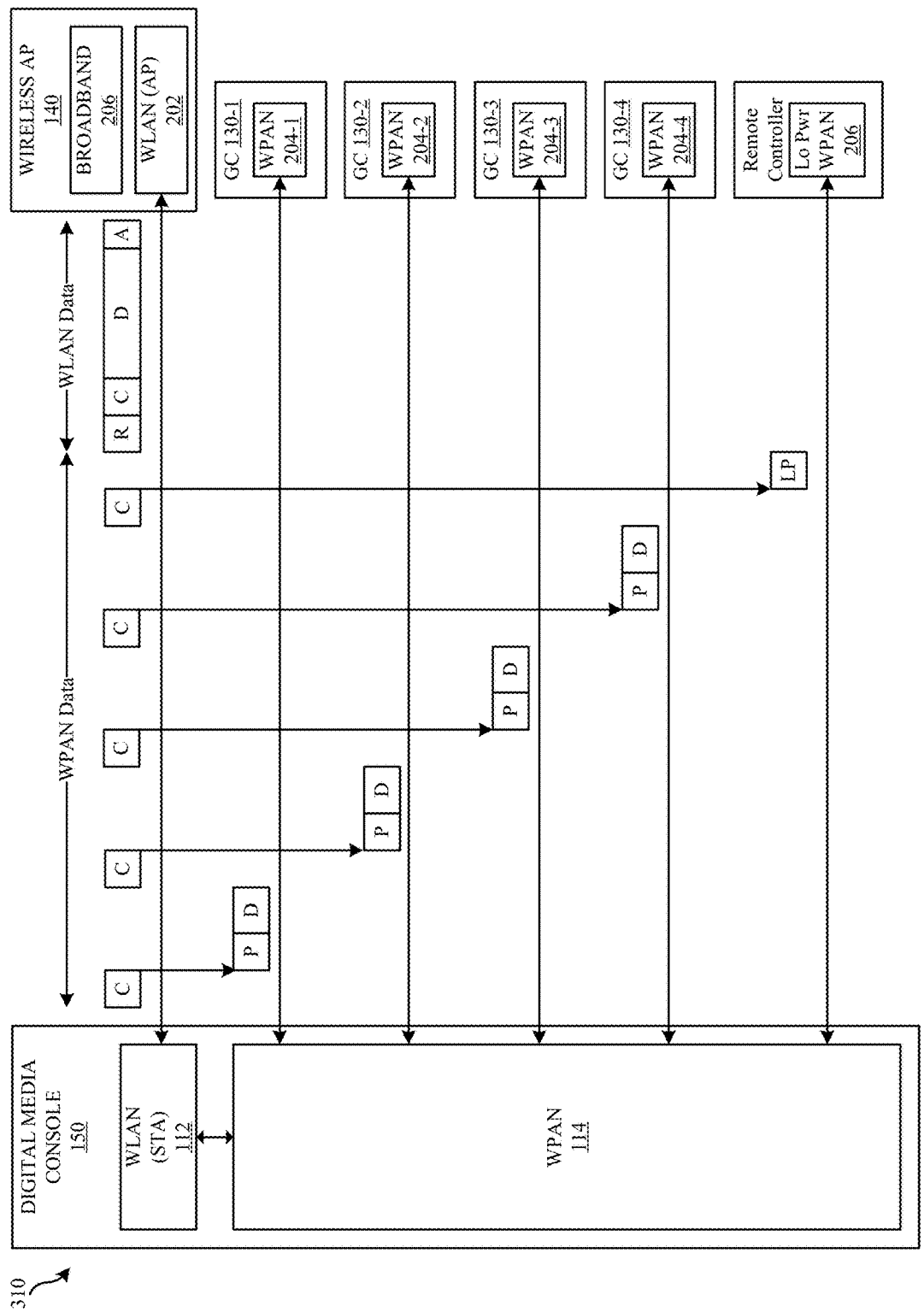

FIG. 3B illustrates a diagram 310 of data packet communication between the digital media console 150 and multiple game controllers 130 and a WLAN AP 140 during a polling time interval. FIG. 3B includes multiple CTS2S messages (indicated by the "C" blocks) to request time for WPAN communication from multiple game controllers 130 as well as from a remote controller 110. The additional time to send the multiple CTS2S messages to secure time for communication of WPAN data reduces the amount of time remaining in a polling interval for communication of WLAN data. In addition, by sending multiple CTS2S request messages, the WLAN (STA) 112 of the digital media console 150 increases a likelihood of collision with an existing WLAN communication by, e.g., the WLAN (AP) 202 module of the WLAN AP 140. One or more of the CTS2S messages may be not honored or may be corrupted by interference, and as a result, WLAN communication and WPAN communication may overlap in time/frequency resulting in interference and corruption of data, which requires retransmission thereby increasing the load on the medium. Potentially, repeated requests for bandwidth, e.g., repeated CTS2S messages for WPAN communication and retransmission of WLAN communication can cause a high packet error rate that impacts throughput substantially in the shared RF band.

Figure 3C:
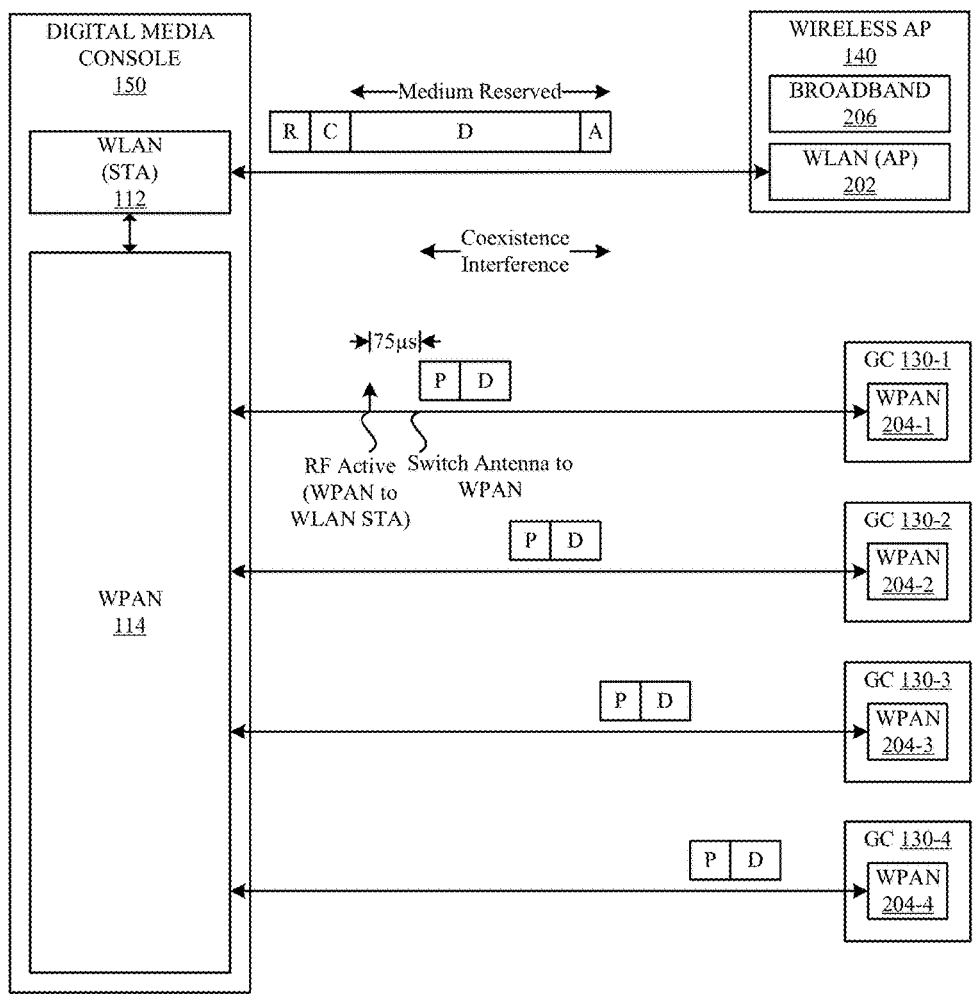

FIG. 3C illustrates a diagram 320 of an example collision of WPAN communication with WLAN communication that can result in coexistence interference. The WLAN (STA) module 112 of the digital media console 150 can be already in active communication with the WLAN (AP) module 202 of the wireless AP 140, where either the WLAN (STA) module 112 or the WLAN (AP) module 202 reserved the RF band for communication before the start of WPAN communication. The WPAN module 114 of the digital media console 150 can send a radio frequency (RF) active indication, e.g., a trigger or interrupt or equivalent, to the WLAN (STA) module 112 of the digital media console 150 to indicate that the WPAN module 114 will being using the shared RF band for WPAN communication. The RF active indication can precede the actual WPAN communication by a lead time, e.g., 75 microseconds. This lead time, however, may be insufficient to allow for completing ongoing WLAN communication. If the WPAN module 114 operates independently of the WLAN (STA) module 112 and begins WPAN communication for the multiple game controllers 130 while the WLAN communication is yet to be completed, the WPAN communication to the game controllers 130 can interfere with successful completion of the WLAN communication. In some cases, the WLAN (STA) module 112 may not have sufficient time from receipt of the RF active indication from the WPAN module 114 to allow for sending a CTS2S message to the WLAN (AP) module 202 of the WLAN AP 140. As indicated in FIG. 3C, the WLAN communication can overlap in time (and frequency when using a common RF band) with the WPAN communication with one or more of the game controllers 130. To reduce the likelihood of coexistence interference, the WPAN module 114 of the digital media console 150 can (i) provide the RF active indication to the WLAN (STA) module 112 of the digital media console 150 earlier, (ii) consolidate WPAN communication time for multiple game controllers 130 into one common request, and/or (iii) monitor activity of the multiple game controllers 130 to determine appropriate polling intervals, e.g., to poll inactive (or less active) game controllers 130 less frequently than active game controllers 130.

Figure 3D:
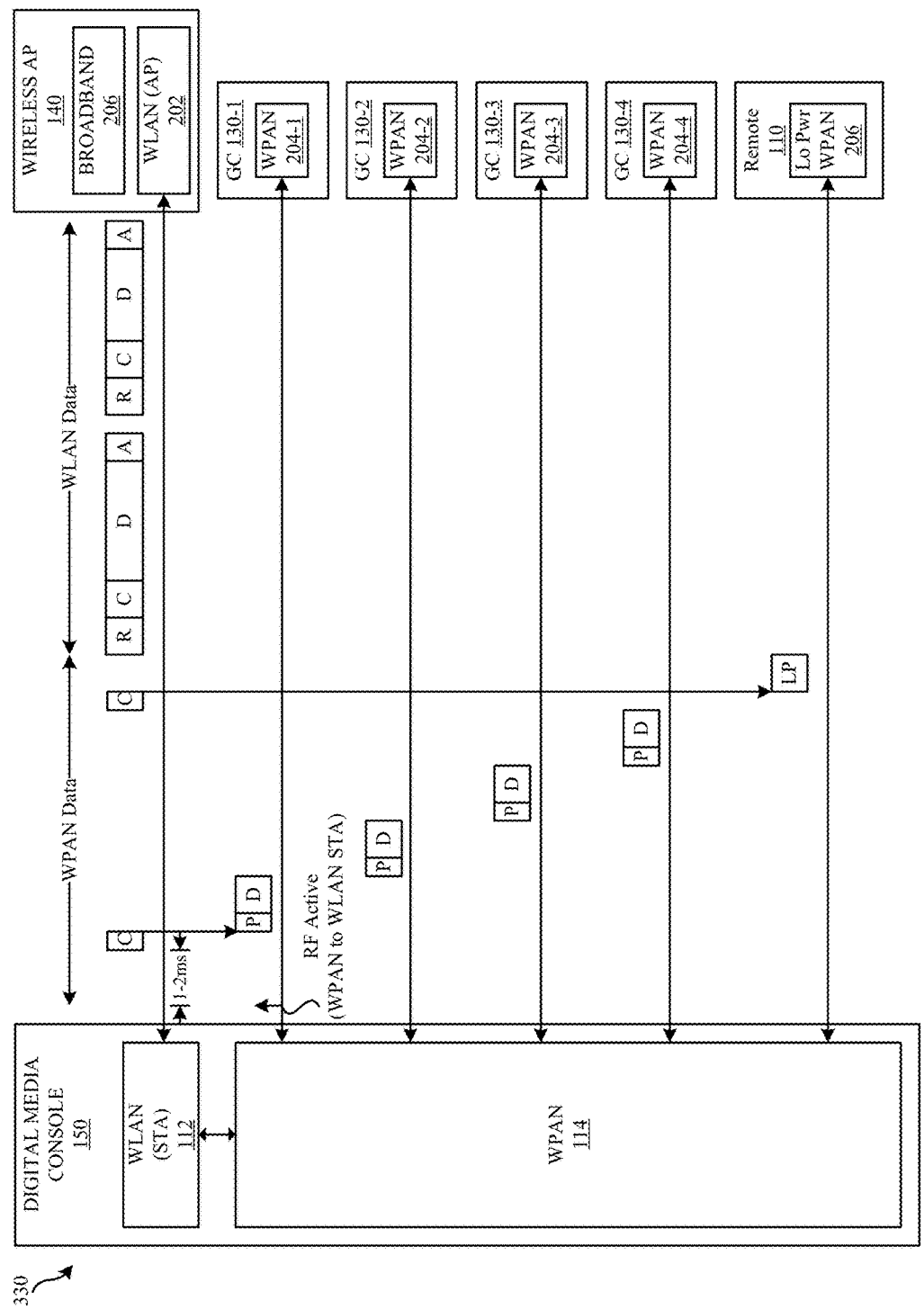

FIG. 3D illustrates a diagram 330 of WPAN data communication and WLAN data communication between a digital media console 150 and a WLAN AP 140. The WPAN module 114 of the digital media console sends an RF active indication to the WLAN (STA) module 112 of the digital media console in advance of WPAN communication. In a representative embodiment, the RF active indication precedes a CTS2S message sent by the WLAN (STA) module 112 to the WLAN (AP) module 202 of the WLAN AP 140 by at least one to two milliseconds. Increasing the lead-time for the RF active indication in advance of the CTS2S message can increase the likelihood of completing WLAN communication and allowing the WLAN (STA) module 112 to send the CTS2S message to the WLAN (AP) module 202. In some embodiments, increasing the lead-time for the RF active indication allows for transmitting the CTS2S message earlier to increase likelihood that the CTS2S message will be received and honored by other WLAN devices, e.g., other WLAN stations (STAs) that share the WLAN provided by the WLAN AP 140, as well as received and honored by the WLAN AP 140, in advance of WPAN polling activity by the WPAN module 114. In some embodiments, the RF active indication can include information about a number of active WPAN devices and/or a time duration for subsequent WPAN communication. In some embodiments, the WLAN (STA) 112 accesses a memory to obtain information about the activity status of WPAN devices, e.g., the WPAN module 114 can provide the information. The WLAN (STA) module 112 of the digital media console 150 sends a single CTS2S message to the WLAN (STA) module 112 for a number of WPAN devices, e.g., for a set of active WPAN devices, which can be a set of game controllers 130. The CTS2S message sent by the WLAN (STA) module 112 can include an indication of a time duration for which the WLAN (STA) module 112 requests the WLAN (AP) module 202 of the WLAN AP 140 to withhold WLAN communication to provide for interference-free RF air time for the WPAN module 114 to communicate with the WPAN devices. In some embodiments, the WLAN (STA) module 112 sends a separate CTS2S message to the WLAN (AP) module 202 to obtain airtime for retrieval of low power (LP) WPAN communication. After communication of the WPAN data, the WLAN (STA) module 112 can communicate WLAN data with the WLAN (AP) module 202 of the WLAN AP 140. Bundling requests for airtime, e.g., a single consolidated CTS2S message, reduces the overall time used for WPAN communication and thereby increases time available for WLAN communication.

In some embodiments, the WLAN (STA) 112 and/or the WLAN (AP) 202 can adjust the use of aggregated data packets, which can extend longer in time than non-aggregated data packets. In some embodiments, the use of WLAN aggregation can be based at least in part on a prediction of the amount of time required for WPAN communication during regular polling intervals. In some embodiments, the use of WLAN aggregation can be based on measured signal strength for signals received by the WLAN (STA) 112 module and/or the WLAN (AP) module 202. In some embodiments, the WLAN (STA) 112 module and/or the WLAN (AP) module 202 enables use of aggregated WLAN data packets when signal strength satisfies a signal strength threshold and disables use of aggregated WLAN data packets when signal strength does not satisfy the signal strength threshold. In some embodiments, the WPAN module 114 monitors data activity for WPAN devices, e.g., for one or more game controllers 130, and maintains a data activity status for the WPAN devices. When a WPAN device does not have data, e.g., based on repeated polling with no response and/or no data to send, for a continuous time duration that meets or exceeds an inactivity threshold, e.g., the WPAN device is idle for at least 5 seconds, the WPAN module 114 of the digital media console 150 can reduce the polling time interval used to poll the WPAN device. For example, active WPAN devices that require regular polling for time-critical data communication can be polled at a first time interval, e.g., every 15 milliseconds, while inactive (or less active) WPAN devices can be polled at a second, longer time interval, e.g., every 30 milliseconds. Thus, the active WPAN devices can be polled at least twice as often as the inactive (or less active) WPAN devices. In some embodiments, the WPAN module 114 provides an indication to the WLAN (STA) module 112 of the digital media console 150 of the number of active WPAN devices and/or an amount of time for a WPAN communication based on the number of active WPAN devices. In some embodiments, only active WPAN devices are polled in a polling time interval, and inactive (or less active) WPAN devices are polled separately and/or less often. In some embodiments, the WPAN module 114 provides an indication of the activity status of WPAN devices and/or the number of active WPAN devices and/or an amount of time required for WPAN communication to the WLAN (STA) module 112 before WPAN communication for a polling time interval, and the WLAN (STA) module 112 determines whether to send the CTS2S message and/or contents of the CTS2S message to determine an amount of time for interference free WPAN communication.

FIG. 4A illustrates a flowchart 400 of an example method for managing coexistence of multiple wireless devices communicating with a wireless network device. At 402, the wireless network device sends a radio frequency (RF) reservation request to a wireless local area network (WLAN) access point (AP) in response to an internal trigger that indicates a wireless personal area network (WPAN) polling period for one or more active WPAN devices associated with the wireless network device. The RF reservation request can include an indication of a duration of the polling periods for the wireless network device to communicate in an RF band shared with the WLAN AP. At 404, the wireless network device polls the one or more active WPAN devices for data during the polling period, where the duration of the polling period is based at least in part on the number of active WPAN devices associated with the wireless network device. In some embodiments, the duration of the polling period suffices to poll each of the active WPAN devices. In some embodiments, the wireless network device (WLAN STA) sends the RF reservation request to the WLAN AP at least one millisecond (1 ms) after receipt of the internal trigger. In some embodiments, the wireless network device (WLAN STA), e.g., digital media console 150, sends the RF reservation request to the WLAN AP at least a lead-time, e.g., 1 or 2 ms, in advance of when the WLAN STA would like access to the WLAN RF medium, e.g., when the WLAN STA would like other wireless devices on the WLAN to not transmit in the shared RF band to reduce interference. In some embodiments, the duration for polling periods is based on a history of activity for the active WPAN devices. In some embodiments, the wireless network device delays transmission of WLAN data during the WPAN polling period to mitigate coexistence interference between WLAN data and WPAN data. In some embodiments, the wireless network device measures a received signal strength indicator (RSSI) for signals received form the WLAN AP and adjusts the use of aggregation for WLAN data packets based on the measured RSSI. In some embodiments, the wireless network device enables aggregation for WLAN data packets when the RSSI satisfies an RSSI threshold and disables aggregation for WLAN data packets when the RSSI does not satisfy the RSSI threshold. In some embodiments, the wireless network device adjusts aggregation for WLAN data packets based at least in part on a number of active WPAN devices. In some embodiments, the wireless network device enables aggregation for WLAN data packets when the number of active WPAN devices associated with the wireless network device does not exceed an associated WPAN device threshold. In some embodiments, the wireless network device disables aggregation for WLAN data packets when the number of active WPAN devices associated with the wireless network device exceeds an associated WPAN device threshold. In some embodiments, the wireless network device determines whether WPAN devices are active or inactive based at least in part on whether the WPAN devices have data to send in response to the polling. In some embodiments, the wireless network device designates a WPAN device as inactive when polling indicates that the WPAN device has no data to send for a continuous time period that exceeds a polling threshold. In some embodiments, the wireless network device adjusts a polling interval between polls of a WPAN device based at least in part on whether the WPAN device is active or inactive. In some embodiments, WPAN devices include human interface devices (HIDs) or game controllers, and the wireless network device adjusts a duration of a polling period based on profiles associated with the WPAN devices. In some embodiments, the profiles indicate polling intervals for the devices, e.g., for HIDs and/or for game controllers.

In some embodiments, a wireless network device configurable to manage coexistence of multiple wireless devices communicating with the wireless network device includes: (i) one or more antennas; (ii) wireless circuitry communicatively coupled to the one or more antennas and to processing circuitry, the wireless circuitry configurable to communicate with a wireless local area network (WLAN) access point (AP) and with wireless personal area network (WPAN) devices; and (iii) the processing circuitry, including one or more processors and memory storing instructions that, when executed by the one or more processors, cause the wireless network device to: in response to an internal trigger indicating a WPAN polling period for one or more active WPAN devices associated with the wireless network device, send a radio frequency (RF) reservation request to the WLAN AP, the RF reservation request including an indication of a duration of the polling period for the wireless network device to communicate in an RF band shared with the WLAN AP; and poll the one or more active WPAN devices for data during the polling period, where the duration of the polling period is based at least in part on the number of active WPAN devices associated with the wireless network device.

Figure 4B:
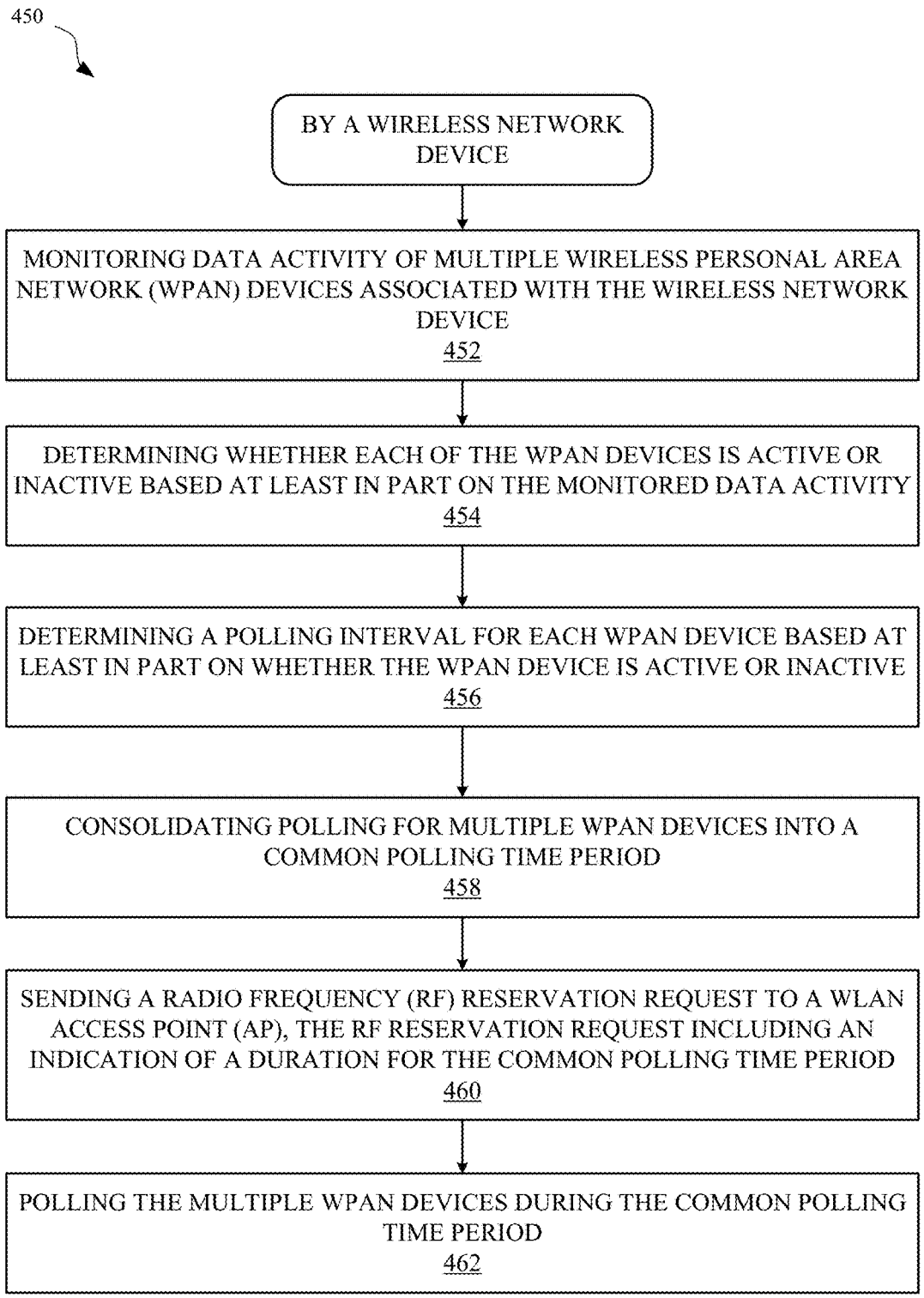

FIG. 4B illustrates a flowchart 450 of another example method for managing coexistence of multiple wireless devices communicating with a wireless network device. The wireless network device, and/or an apparatus configurable for operation in a wireless network device, includes processing circuitry including one or more processors and a memory storing instructions that when executed by the one or more processors cause the wireless network device and/or the apparatus of the wireless network device to perform a method for managing coexistence of multiple wireless devices communicating with a wireless network device. At 452, the wireless network device monitors data activity of multiple WPAN devices associated with the wireless network device. At 454, the wireless network device determines whether each of the WPAN devices is active or inactive based at least in part on the monitored data activity. At 456, the wireless network device determines a polling interval for each WPAN device based at least in part on whether the WPAN device is active or inactive. At 458, the wireless network device consolidates polling for multiple WPAN devices into a common polling time period. At 460, the wireless network device sends a radio frequency (RF) reservation request, e.g., to a wireless local area network (WLAN) access point (AP), the RF reservation request including an indication of a duration for the common polling time period. At 462, the wireless network device polls the multiple WPAN devices during the common polling time period.

Figure 5:
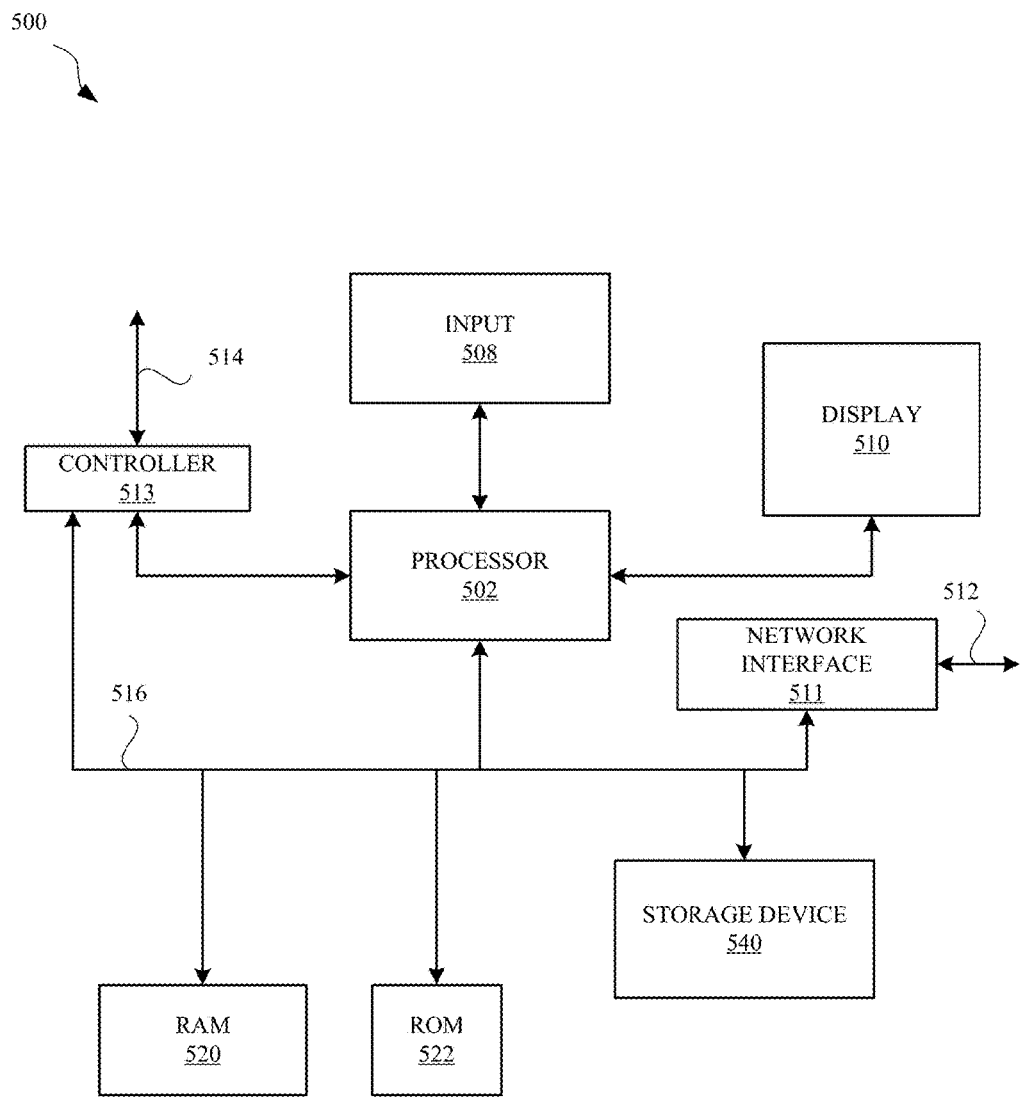
FIGS. 5 and 6 illustrate diagrams of example wireless network devices that can be used to implement the various techniques described herein, according to some embodiments.

FIG. 5 illustrates a detailed view of a computing device 500 that can be used to implement the various components described herein, according to some embodiments. In particular, the detailed view illustrates various components that can be included in the digital media console 150 and/or in user devices illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include an optional integrated display 510 (e.g., a screen display) that can be controlled by the processor 502 to display information to the user or an external non-integrated display (not shown). A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or multiple disks (e.g., hard drives), and includes a storage management module that manages one or more partitions within the storage device 540. In some embodiments, the storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500.

Figure 6:
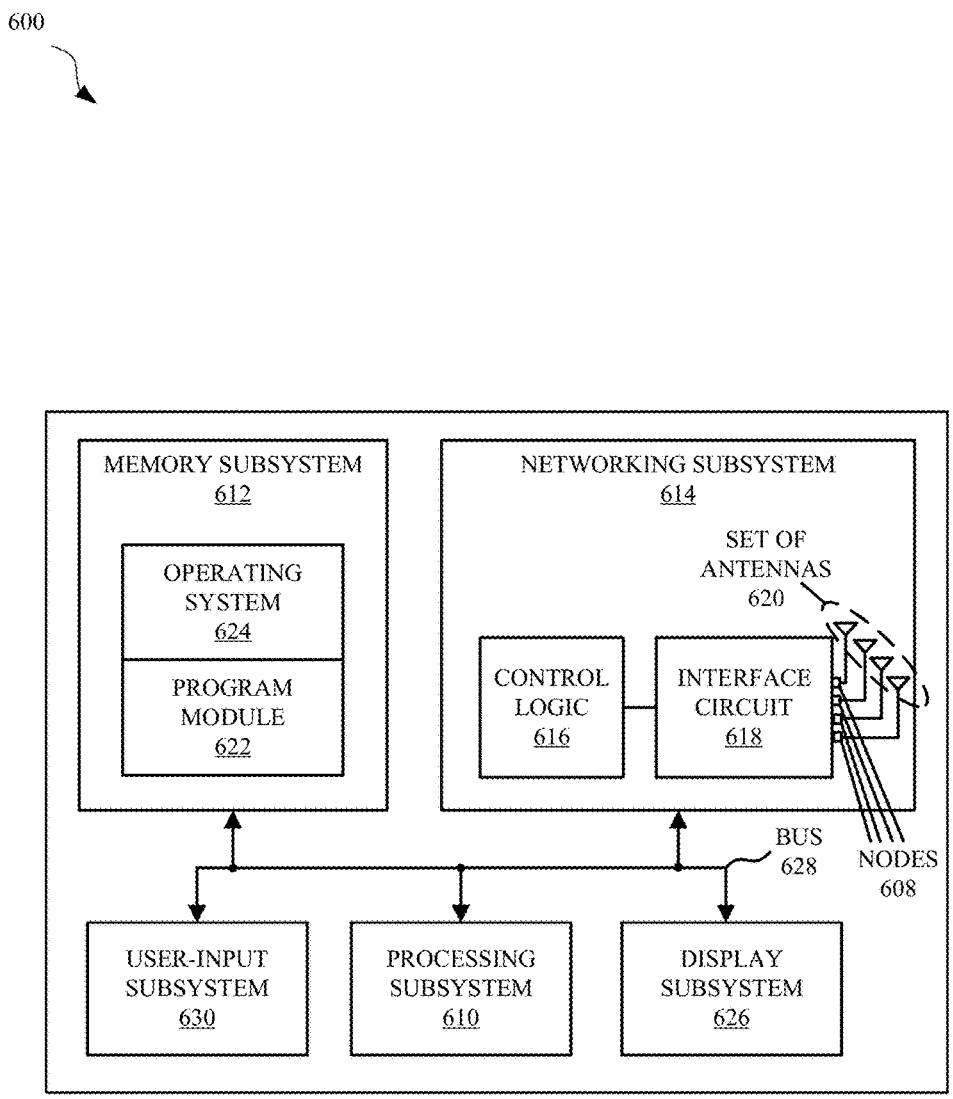

FIG. 6 illustrates a detailed view of an electronic device 600 that can be used to implement the various components described herein, according to some embodiments. In particular, the detailed view illustrates various components that can be included in the digital media console 150 and/or in user devices illustrated in FIG. 1. FIG. 6 presents a block diagram of an electronic device 600 (which may be a digital media console, a WLAN station, a WLAN AP, a WPAN device, or the like) in accordance with some embodiments. This electronic device 600 includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 2514. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: one or more program modules or sets of instructions (such as program module 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and a set of antennas 620 (or antenna elements) in an adaptive array that can be selectively turned on and/or off by control logic 616 to create a variety of optional antenna patterns or 'beam patterns.' (While FIG. 6 includes set of antennas 620, in some embodiments electronic device 600 includes one or more nodes, such as nodes 608, e.g., a pad, which can be coupled to set of antennas 620. Thus, electronic device 600 may or may not include the set of antennas 620.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices.

Within electronic device 600, processing subsystem 610, memory subsystem 612, and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used.

Thus, the communication avoidance technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618. In some embodiments, the communication avoidance technique is implemented, at least in part, in a MAC layer and/or in a physical layer in interface circuit 618.

In the preceding description, we refer to 'some embodiments.' Note that 'some embodiments' describes a subset of all of the possible embodiments, but does not always specify the same subset of embodiments.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for managing coexistence of multiple wireless devices communicating with a wireless network device, the method comprising:
by the wireless network device:
in response to an internal trigger indicating a wireless personal area network (WPAN) polling period for a plurality of active WPAN devices associated with the wireless network device, sending a radio frequency (RF) reservation request to a wireless local area network (WLAN) device, the RF reservation request including an indication of a duration of the polling period for the wireless network device to communicate in an RF band shared with the WLAN device; and
polling the plurality of active WPAN devices for data during the polling period, wherein:
the duration of the polling period is based at least in part on the number of active WPAN devices associated with the wireless network device, and
the wireless network device adjusts the use of aggregation for WLAN data packets communicated with the WLAN device based at least in part on (i) a signal strength measured by the wireless network device and/or (ii) the number of active WPAN devices.

2. The method of claim 1, wherein the duration of the polling period is sufficiently long to poll each of the plurality of active WPAN devices.

3. The method of claim 1, wherein the wireless network device sends the RF reservation request to the WLAN device at least one millisecond before the polling period.

4. The method of claim 1, wherein the duration of the polling period is based at least in part on a history of activity for the plurality of active WPAN devices.

5. The method of claim 1, further comprising:
by the wireless network device:
delaying transmission of WLAN data during the polling period to mitigate coexistence interference between a WLAN interface and a WPAN interface.

6. The method of claim 1, further comprising:
by the wireless network device:
measuring a received signal strength indicator (RSSI) for signals received from the WLAN device;
enabling aggregation for the WLAN data packets when the RSSI satisfies an RSSI threshold; and
disabling aggregation for the WLAN data packets when the RSSI does not satisfy the RSSI threshold.

7. The method of claim 1, further comprising:
by the wireless network device:
enabling aggregation for the WLAN data packets when the number of active WPAN devices not exceed an associated WPAN device threshold; and
disabling aggregation for the WLAN data packets when the number of active WPAN devices the associated WPAN device threshold.

8. The method of claim 1, further comprising:
by the wireless network device:
determining whether a WPAN device is active based at least in part on whether the WPAN device has data to send in response to the polling; and
designating the WPAN device as inactive when polling indicates the WPAN device has no data to send for a time period that exceeds a polling threshold.

9. The method of claim 8, further comprising:
by the wireless network device:
adjusting a polling interval between polls of the WPAN device based at least in part on whether the WPAN device is active or inactive.

10. The method of claim 1, wherein the plurality of active WPAN devices comprise at least one of human interface devices (HIDs) or game controllers, and the wireless network device adjusts the duration of the polling period based on one or more profiles associated with the plurality of active WPAN devices, the profiles indicating polling intervals for at least one of HIDs or game controllers.

11. A wireless network device configurable to manage coexistence of multiple wireless devices communicating with the wireless network device, the wireless network device comprising:
one or more antennas;
wireless circuitry communicatively coupled to the one or more antennas and to processing circuitry, the wireless circuitry configurable to communicate with a wireless local area network (WLAN) access point (AP) and with wireless personal area network (WPAN) devices; and the processing circuitry, including one or more processors and memory storing instructions that, when executed by the one or more processors, cause the wireless network device to:

transmit, in response to an internal trigger indicating a WPAN polling period for one or more active WPAN devices associated with the wireless network device, a radio frequency (RF) reservation request to the WLAN AP, the RF reservation request including an indication of a duration of the polling period for the wireless network device to communicate in an RF band shared with the WLAN AP; and poll the one or more active WPAN devices for data during the polling period, wherein:

the duration of the polling period is based at least in part on the number of active WPAN devices associated with the wireless network device; and the wireless network device adjusts the use of aggregation for WLAN data packets communicated with the WLAN device based at least in part on (i) a signal strength measured by the wireless network device and/or (ii) the number of active WPAN devices.

12. The wireless network device of claim 11, wherein the duration of the polling period is sufficiently long to poll each of the active WPAN devices.

13. The wireless network device of claim 11, wherein the wireless network device sends the reservation request at least one millisecond before the polling period.

14. The wireless network device of claim 11, wherein the duration of the polling period is based at least in part on a history of activity for the active WPAN devices.

15. The wireless network device of claim 11, wherein execution of the instructions further causes the wireless network device to delay transmission of WLAN data during the polling period to mitigate coexistence interference between WLAN data and WPAN data.

16. The wireless network device of claim 11, wherein execution of the instructions further causes the wireless network device to:

measure a received signal strength indicator (RSSI) for signals received from the WLAN AP;

enable aggregation for the WLAN data packets when the RSSI satisfies an RSSI threshold; and disable aggregation for the WLAN data packets when the RSSI does not satisfy the RSSI threshold.

17. The wireless network device of claim 11, wherein execution of the instructions further causes the wireless network device to:

enable aggregation for the WLAN data packets when the number of active WPAN devices associated with the wireless network device does not exceed an associated WPAN device threshold; and disable aggregation for the WLAN data packets when the number of active WPAN devices associated with the wireless network device exceeds the associated WPAN device threshold.

18. The wireless network device of claim 11, wherein execution of the instructions further causes the wireless network device to:

determine whether a WPAN device is inactive based at least in part on whether the WPAN device has data to send in response to the polling;

designate the WPAN device as inactive when polling indicates the WPAN device has no data to send for a time period that exceeds a polling threshold; and adjust a polling interval for polling the WPAN device based at least in part on designating the WPAN device as inactive.

19. The wireless network device of claim 11, wherein the active WPAN devices comprise at least one of human interface devices (HIDs) or game controllers, and the wireless network device adjusts the duration of the polling period based on a profile associated with the active WPAN devices, the profile indicating a polling interval for HIDs or game controllers.

20. An apparatus configurable for managing coexistence of multiple wireless devices communicating with a wireless network device, the apparatus comprising:

processing circuitry, including one or more processors and memory storing instructions that, when executed by the one or more processors, cause the wireless network device to:

monitor data activity of a plurality of wireless personal area network (WPAN) devices associated with the wireless network device;

determine whether each WPAN device of the plurality of WPAN devices is active or inactive based at least in part on the monitored data activity;

determine a polling interval for each WPAN device of the plurality of WPAN devices based at least in part on whether the WPAN device is active or inactive;

consolidate polling for multiple WPAN devices of the plurality of WPAN devices into a common polling time period;

transmit a radio frequency (RF) reservation request to a wireless local area network (WLAN) access point (AP), the RF reservation request including an indication of a duration for the common polling time period; and poll the multiple WPAN devices during the common polling time period, wherein:

the duration of the common polling time period is based at least in part on the number of active WPAN devices associated with the wireless network device, and the wireless network device adjusts the use of aggregation for WLAN data packets communicated with the WLAN device based at least in part on (i) a signal strength measured by the wireless network device and/or (ii) the number of active WPAN devices.

* * * * *

UNITED STATES PATENT AND TRADEMARK OFFICE
CERTIFICATE OF CORRECTION

PATENT NO. : 10,375,035 B2  
APPLICATION NO. : 15/479191  
DATED : August 6, 2019  
INVENTOR(S) : Chen et al.

Page 1 of 1

It is certified that error appears in the above-identified patent and that said Letters Patent is hereby corrected as shown below:

In the Claims

In Claim 7, at Column 18, Lines 35-36: "WPAN devices not exceed an associated WPAN" should read -- WPAN devices does not exceed an associated WPAN --.

In Claim 7, at Column 18, Lines 38-39: "WPAN devices the associated WPAN" should read -- WPAN devices exceeds the associated WPAN --.

Signed and Sealed this  
Thirty-first Day of December, 2019

Andrei Iancu  
*Director of the United States Patent and Trademark Office*